United States Patent [19]

Narayan et al.

[11] Patent Number: 5,616,671
[45] Date of Patent: Apr. 1, 1997

[54] POLYSACCHARIDES GRAFTED WITH ALIPHATIC POLYESTERS DERIVED FROM CYCLIC ESTERS

[75] Inventors: Ramani Narayan, Okemos, Mich.; Philippe Dubois, Ciplet, Belgium; Mohan Krishnan, Okemos, Mich.

[73] Assignee: Board of Trustees operating Michigan State University, East Lansing, Mich.

[21] Appl. No.: 632,291

[22] Filed: Apr. 15, 1996

Related U.S. Application Data

[62] Division of Ser. No. 400,979, Mar. 8, 1995, Pat. No. 5,540,929.

[51] Int. Cl.$^6$ ................................. C08G 16/00
[52] U.S. Cl. ........................... 527/300; 527/305
[58] Field of Search ...................... 527/300, 305

[56] References Cited

U.S. PATENT DOCUMENTS

| | | | |
|---|---|---|---|
| 3,321,422 | 5/1967 | Houff et al. | 524/47 |
| 4,079,025 | 3/1978 | Young et al. | 527/312 |
| 4,454,268 | 6/1984 | Otey et al. | 524/47 |
| 4,529,788 | 7/1985 | Asami et al. | 527/300 |
| 4,663,388 | 5/1987 | Douglass et al. | 525/54.3 |
| 5,191,016 | 3/1993 | Yalpani | 525/54.2 |
| 5,217,803 | 6/1993 | McBride et al. | 428/323 |
| 5,254,607 | 10/1993 | McBride et al. | 524/52 |
| 5,268,422 | 12/1993 | Yalpani | 525/54.2 |
| 5,286,770 | 2/1994 | Bastioli et al. | 524/52 |
| 5,321,088 | 6/1994 | Schwab | 525/186 |

FOREIGN PATENT DOCUMENTS 9219680  5/1992  WIPO.

OTHER PUBLICATIONS

Bagley, Fanta et al., Polymer Engineering and Science, 17 (5), p. 311 (1977).
Pledger, Young et al., J. Macromol. Sci.–Chem., A22(4), p. 415 (1986).
Tahan and Zilkha, Journal of POlymer Science: A–1, 7, p. 1815 (1969).
Chinnaswamy and Hanna (Starch/Starke, 43: (10) p. 396 (1991).

*Primary Examiner*—Nathan M. Nutter
*Attorney, Agent, or Firm*—Ian C. McLeod

[57] ABSTRACT

Novel synthetic pathways to derive aliphatic polyester-grafted polysaccharides from cyclic ester monomers, preferably, poly($\epsilon$-caprolactone) and starch. Different reaction schemes lead to compositions with various levels of grafting. The grafting reactions were conducted using bulk monomer and an organometallic polymerization agent (catalyst or initiator) such as metal alkoxides initiators which were generated in-situ by the reaction of metal alkyls with hydroxyl groups of the polysaccharide. The grafting reactions were characterized by very fast reaction times of the order of a few minutes to effect complete conversion of monomer. Biodegradable compositions, particularly using these poly($\epsilon$-caprolactone)-grafted starch are described for use in film applications.

8 Claims, No Drawings

3,616,671

POLYSACCHARIDES GRAFTED WITH ALIPHATIC POLYESTERS DERIVED FROM CYCLIC ESTERS

GOVERNMENT RIGHTS

This invention was developed under Contract No. 94341890067 Cooperative State Research Service, U.S. Department of Agriculture. The U.S. government has certain rights in this invention.

This is a divisional of application Ser. No. 08/400,979, filed on 03/08/95 and now U.S. Pat. No. 5,540,929.

BACKGROUND OF THE INVENTION

(1) Field of the Invention

The present invention relates to the synthesis of aliphatic polyester-grafted polysaccharides prepared by in situ polymerization of a cyclic ester monomer in the presence of a polysaccharide and an organometallic catalyst initiator, wherein the ring-opening polymerization is conducted via bulk polymerization of the ester monomer, preferably in the absence of solvents. The present invention preferably relates to the synthesis of aliphatic polyester-grafted starch-like polysaccharides. The present invention further relates to novel compositions based on blends and composites of the aliphatic polyester-grafted polysaccharides with other thermoplastic polymers, and other additives commonly used in the plastics industry, in which there is good interfacial adhesion between the component phases. Durable and cost-effective materials are produced. The compositions are suitable for use in a number of applications including biodegradable moldings, sheets, films, or foam structures and are processed by any of the melt processing methods employed in the plastics industry.

DESCRIPTION OF RELATED ART

In the last decade, considerable effort has gone into the development of biodegradable polymers, including polymer blends and composites, using starch. The melt processing characteristics and mechanical properties of unmodified starch polymers are very poor compared to typical synthetic polymers. Some of the problems associated with starch based compositions include thermal decomposition of starch before melting, water absorption, and poor mechanical properties. Physical or chemical modifications of the starch molecule or granule is a viable alternative to solving some of these problems. Physical modifications include coating the starch granules with hydrophobic sizing agents similar to those used in the paper industry, like rosin and silanes or physically coating the end product with hydrophobic materials like low molecular weight waxes, and natural resins (zein, rosin, shellac etc.) and higher molecular weight nonpolar polymers. Cross-linking of the starch granules is another physical modification route to improving the hydrophobicity of starch-based materials. A physico-thermal route to improving the melt processability of starch is by the use of an external plasticizer to solvate the starch granules and enhance the room temperature flexibility of the final product. In a typical plasticized system with starch, the diffusion of plasticizer out of the product when exposed to low humidity conditions and diffusion of water in to the product under high humidity conditions is an inevitable result. This causes embrittlement of the product due to loss of plasticizer (low humidity) and problems associated with retention of product shape, texture, and form due to excess absorbed water (high humidity). These effects are detrimental particularly when water is used as a plasticizer, but are prevalent even in non-water based starch formulations that incorporate hygroscopic plasticizers. In general, due to the poor durability of plasticized starch upon exposure to different environments (due to its hydrophilic nature) there is very little commercial use of plasticized native or unmodified starch by itself. Early patents in this field relate to the extrusion of amylose primarily using water as a plasticizer. In addition, poly(vinyl alcohol), glycerol and other related materials were also incorporated into the system. More recently, extruded compositions using water and urea as destructurizing agents for starch and the simple blends of these with other polymers were discussed in PCT Int. Appl. WO 92/19680 (Novamont S.p.a.). Due to the poor compatibility between various components of the blend, compositions containing significant amounts of starch exhibited poor mechanical properties. There is a great need to enhance the interfacial compatibility and other properties in systems using starch.

Chemical modification of starch includes grafting reactions and non-degradative substitution of the hydroxyls on the starch with functional groups such as esters, ethers, isocyanates and the like. A number of starch derivatives with varying degrees of substitution have been prepared, primarily for food applications and more recently for structural applications. Starch graft copolymers produced from various vinyl monomers, including styrene, methyl methacrylate, methyl acrylate, and butyl acrylate, containing about 50% starch by weight, have been prepared by a solution process in which the starch grafting was initiated by radiation in the case of styrene and by cerium ion in the case of other monomers (Bagley, Fanta et. al., Polymer Engineering and Science, 17 (5), p. 311, (1977)). These compositions were extruded directly without addition of plasticizer or homopolymer to give useful products. However, the reaction times for polymerizations were on the order of hours. Starch acrylamide copolymers were prepared by $Ce^{4+}$ initiated grafting reactions in solution (Pledger, Young et. al., J. Macromol. Sci.-Chem., A22(4), p. 415, (1986)). Starch-acrylonitrile copolymers, also obtained by $Ce^{4+}$ initiated grafting reactions in solution are also known and suffer from the same processing drawbacks. Anionic polymerization of ethylene oxide on starch has also been reported (Tahan and Zilkha, Journal of Polymer Science: A-1, 7, p. 1815 (1969)). Reactive extrusion of starch graft copolymers using starch macroradicals generated by shear inside an extruder in the presence of vinylic monomers and/or polymers leading to low levels of grafting was studied by Chinnaswamy and Hanna (Starch/Starke, 43 (10), p. 396 (1991)).

Polysaccharide grafted polymer derivatives are well known to those skilled in the art. Such derivatives are described in U.S. Pat. Nos. 3,321,422 to Houff et al (unsaturated monomers); 4,079,025 to Young et al (unsaturated monomers); 4,454,268 to Otey et al (acrylic monomers); 4,663,388 to Douglass et al (unsaturated monomers); 5,191,016 and 5,268,422 to Yalpani (polyhydroxyalkanoates); 5,217,803 and 5,254,607 to McBride et al (unsaturated monomers); and 5,286,770 to Bastioli et al (unsaturated monomers).

Biodegradable polymers of lactones and other cyclic ester monomers are well known as illustrated by U.S. Pat. No. 5,321,088 to Schwab. What is needed are polysaccharide graft-polymers of the cyclic ester monomers, in which the grafting leads to good processing and mechanical properties.

There is a need for novel grafted polysaccharides which are biodegradable and which contribute to making the polysaccharide compatible with other polymers. Such aliphatic polyester-grafted starch material can be used as compatibilizers to promote good interfacial adhesion.

OBJECTS

It is therefore an object of the present invention to provide compositions and a process for grafting aliphatic polyesters on to polysaccharides by an in situ, ring-opening polymerization of the cyclic ester monomers in the presence of the polysaccharide. It is further an object of the present invention to provide preferred compositions and a process for grafting biodegradable aliphatic polyesters onto the surface of a starch-like polysaccharide substrate by an in situ, ring-opening, bulk polymerization, preferably without solvents, of cyclic ester monomers in the presence of the polysaccharide, wherein the polysaccharide is in a form that is granular, plasticized, destructurized, solvated or physically or chemically modified in any other way, or a mixture of these. Further, it is an object of the present invention to provide novel compositions based on blends and composites of the polyester-grafted starch with other polymers in which good interfacial adhesion between phases is provided and to provide methods to produce the same. Further still, it is an object of the present invention to provide such compositions which are useful for forming various objects, including moldings, sheets, foams, and films. Further, it is an object of the present invention to provide a process which is relatively easy to perform and which is economical. These and other objects will become increasingly apparent by reference to the following description.

DESCRIPTION OF PREFERRED EMBODIMENTS

The present invention relates to a polymer composition which comprises an aliphatic polyester grafted to a polysaccharide to provide a grafted polymer, wherein the polymer is derived by a ring opening polymerization and reaction of the polysaccharide containing less than about 2 percent by weight moisture with a cyclic aliphatic ester monomer containing 4 to 24 carbon atoms in the presence of an anhydrous organometallic polymerizing agent (catalyst and/or initiator), wherein the grafted polymer is between about 0.1% and 99% of the polymer composition. The cyclic group of the ester monomer usually contains between 4 and 8 carbon atoms. Preferably the polysaccharide is 1 to 95% by weight of the monomer and starch in the reaction mixture.

Further, the present invention relates to a biodegradable composition comprising in admixture: an aliphatic polyester-grafted first polymer, derived by polymerization of a cyclic aliphatic ester monomer in the presence of a polysaccharide and an organometallic polymerizing agent (catalyst and/or initiator); and a second biodegradable polymer in an amount of 10 to 90% by weight of the composition.

Further still, the present invention relates to a process for forming a polymer which is a polysaccharide grafted with an aliphatic polyester which comprises: reacting the polysaccharide which contains less than 2 percent moisture with a cyclic aliphatic ester monomer containing 4 to 24 carbon atoms in the presence of an organometallic polymerizing agent (catalyst and/or initiator) at a temperature between about 60° and 150° C. to produce the first polymer.

Finally the present invention relates to a polysaccharide derivative which comprises a starch-like polysaccharide grafted with an aliphatic polyester containing 4 to 24 carbon atoms, wherein the cyclic aliphatic ester as a monomer containing less than about 2% moisture is reacted with the starch-like polysaccharide in the presence of an anhydrous organometallic polymerizing agent to produce the polysaccharide derivative.

The term "polysaccharide" means a compound having repeating saccharide units including starch, polydextrose, lignocellulose, cellulose, and derivatives of these (e.g. methyl cellulose, ethyl cellulose, carboxymethylcellulose, hydroxyethylcellulose, cellulose acetate, cellulose acetate butyrate, cellulose acetate propionate, starch and amylose derivatives, amylopectin and its derivatives and other chemically and physically modified starches) and the like.

Preferably the polysaccharides are in the form of particles or granules having a mean size of less than 20 microns preferably 1 to 10 microns, and can be used directly. The polysaccharide can also be solvated, plasticized or destructurized in a manner well known to those skilled in the art so long as hydroxyl groups are present on the polysaccharide to enable the graft reaction to proceed.

Polysaccharides, particularly starches, used in this invention are materials composed of amylose and amylopectin, i.e., linear and branched polymers of alpha-D-glucopyranosyl units, respectively, and are referred to hereinafter as "starch-like polysaccharides". Preferably, the present invention relates to the synthesis of aliphatic polyester-grafted starch by in-situ polymerization of the respective ester monomers in the presence of starch-like polysaccharides that can be granular, plasticized, destructurized, solvated, physically or chemically modified in any other way, or a mixture of these, wherein the in situ, ring-opening polymerization is conducted via bulk polymerization of the ester monomer (in the absence of solvents).

Preferably biodegradable compositions are produced based on aliphatic polyester-grafted polysaccharides obtained by mixing starch and ester monomer and an organometallic initiator, followed by in situ, ring-opening polymerization of the bulk monomer, preferably without solvents, in the presence of the polysaccharide, leading to grafting of the polyester chains on to polysaccharide. The polymerization is initiated using the amylose/amylopectin hydroxyl functions in the presence of the catalyst/initiator or by adequate modification/activation of the surface hydroxyls, thereby promoting grafting and good interfacial adhesion between the two phases.

The use of bulk monomer for the ring-opening, bulk polymerization of cyclic ester monomers in the presence of the polysaccharide enables the use of an extruder for processing control over the level of grafting, ease of control of final material properties, and enhanced interfacial adhesion leading to substrate encapsulation. These are key advantages afforded by this invention.

The present invention relates to a composition aliphatic polyester-grafted polysaccharides in which the reaction conditions are controlled to result in percent grafting that ranges from 0.1 to 99% by weight of the polysaccharide, and wherein such grafting reactions are preferably conducted in an extruder, reactor, mixer or combinations thereof. Specifically, the present invention relates to compositions and synthetic pathways for grafting biodegradable aliphatic polyesters like polylactones, polylactides and polyglycolides on to the surface of a polysaccharide by in situ, ring-opening polymerization of the cyclic ester monomers in the presence of the polysaccharide, wherein the amount of cyclic ester monomer in the reactant mixture is in the range of 1 to 99% by weight based on the total amount of polysaccharide and monomer in the reaction mixture, and wherein the polysaccharide is dried to less than 2 percent moisture by weight, in a form that is granular, plasticized, destructured, solvated or physically or chemically modified in any other way, or a mixture of these.

The present invention also relates to a biodegradable, durable composition comprising blends and composites of such aliphatic polyester-grafted polysaccharide and other components including hydrophobic thermoplastic polymers and other like additives. Such compositions can be preferably produced in an extruder or other similar equipment and can be used in a variety of applications like films, sheets, moldings and foam structures. Specifically, the present invention relates to biodegradable compositions produced by grafting polymerization of the cyclic ester monomer in the presence of starch, wherein the polymerization is initiated in situ from the starch phase using the amylose/amylopectin hydroxyl functions in the presence of a catalyst/initiator or by adequate modification/activation of the surface hydroxyls, wherein the polymerization is preferably conducted in the absence of solvents (bulk polymerization), and wherein the in situ grafting reaction and polymerization leads to enhanced interfacial adhesion. Further, the present invention relates to various catalyst/initiators suitable for the graft polymerization reactions that are within the scope of the invention. Further still, the present invention relates to various synthetic pathways for preparing such biodegradable compositions which involve separate or simultaneous graft polymerization reactions, wherein one or more of the conventional processing methods used in the polymer industry is employed alone or in combination with one another, i.e., dry mixing, batch mixing and reaction, simple and reactive extrusion, injection molding, blow molding, compression molding, thermoforming, profile extrusion, flat-die film extrusion, blown film extrusion, and co-extrusion.

The present invention particularly relates to biodegradable compositions based on aforementioned polyester-grafted starch and blends of these with other components, in which good interfacial adhesion between the component phases is generated and wherein the preferred form of the final composition is used in the manufacture of biodegradable films for bags and disposables.

The preferred mechanism of preparing such compositions is by the use of Lewis acid catalysts such as stannous octoate to promote polymerization of ε-caprolactone in the presence of starch, by the anchoring of active initiating species on to starch, wherein the initiator is based on aluminum alkoxides like aluminum isopropoxide (AIP) and aluminum tri-sec butoxide (ATSB), used as is or generated in situ from the reaction of starch hydroxyls with initiators based on alkyl aluminum like tri ethyl aluminum (TEA) and di-isobutyl aluminum hydride (DIBAL-H), or by mixtures of the above. Another preferred embodiment of this invention is a biodegradable composition based on blends or composites of aforementioned poly(ε-caprolactone)-grafted starch with other polymers and additives.

Compositions with two phases can be generated with a variety of morphologies that ultimately affect the properties of the blend. Typical morphologies observed in multicomponent polymer systems are as follows:

Dispersed arrangement;

Layered arrangement; and

Co-continuous or inter-penetrating network structure.

In a dispersed arrangement, one phase is dispersed in a matrix of the second phase. In such a system, the matrix phase properties typically dominate the properties of the blend. Such a morphology can be generated by extrusion compounding or other solution processing methods. The dispersed phase geometry can be droplets or fibrillar and the nature of this and the size distribution of the dispersed phase is determined by the interfacial tension between the components and the viscosity ratios at the processing conditions. The factors that determine which of the components form the continuous phase (in a melt-blended product) depends primarily on composition and melt viscosity ratios.

A layered arrangement or parallel arrangement is a non-isotropic structure in which both the components contribute towards blend properties. Co-extruded blends are examples of such arrangements.

If both the polymer components form a co-continuous phase network structure, the properties of the blend tend to be spatially isotropic and both the components contribute towards the final properties of the blend. Melt extrusion of the two components with control of the rheology can lead to formation of such structures.

In accordance with the present invention, a dispersed phase morphology with the starch phase being the dispersed phase can be generated by melt compounding in the extruder. A two-phase morphology with the starch phase being the dispersed phase affords an optimum balance of mechanical properties, water resistance, product cost, and processability.

The components of the reaction mixture that are employed to derive said aliphatic polyester-grafted starch substrates include the following:

(I) polysaccharides composed of linear and branched polymers of alpha-D-glucopyranosyl units, dried to a moisture content of less than 2% by weight and wherein the starch phase may be in a form that is granular, plasticized, destructurized, solvated or physically or chemically modified in any other way, or as a mixture of these, preferably in the range of 1 to 95% by weight based on the total amount of polysaccharide and monomer in the reactant mixture, and (II) one or more polymerizable cyclic ester monomers containing 4 to 24 carbon atoms, such as lactones, lactides, and glycolide, substituted or not, and mixtures of the same that polymerize to form high molecular weight polymers, preferably in the range of 1 to 95% by weight based on the total amount of starch and monomer in the reactant mixture, and (III) the polymerizing agent (catalyst and/or initiator), such as Lewis acid catalyst, metal alkyl, metal alkoxide and mixtures of these to catalyze or initiate polymerization of the desired monomer, as in (II), in the range of 0.001 to 5% by weight of the total reaction mixture, and (IV) optionally, other additives like reaction terminators, organic peroxides and a monomeric or polymeric plasticizer, other than water, or a destructurizing agent, each composed of polar groups, such as OH, —NH, and —NH$_2$ that has a boiling point appreciably greater than the processing temperature, in the range of 0.1 to 30% by weight of the total reaction mixture.

The polysaccharides applicable to the present invention, as outlined in (I) above, have hydroxyl groups that serve as sites for grafting of chains of aliphatic polyesters.

It is preferred that the dispersed phase, reactive substrate containing suitable functional groups used in this invention be starch-like polysaccharides. The sources of such starches are rice, corn, potato, tapioca, wheat, oats and many others. Physically and chemically modified starches and high amylose starches, modified or not, hydrophobic or not are also included in the scope of the invention. Such materials include amylopectin, amylose, starch and amylose esters having a degree of substitution in the range of 0.5 to 3, hydroxyalkyl starches with a degree of substitution in the range of 0.1 to 3 and the like, all being in their native form or one that is granular, plasticized, destructurized, solvated, physically or chemically modified in any other way, and mixtures of these so long as hydroxyl or amine groups are available for reaction with the cyclic ester monomer.

It is further preferred that the starches used be derived from corn, wheat, and potato, in a form that is granular, plasticized, destructurized, solvated, physically or chemically modified in any other way, or mixtures of these. The amount of such starches in the reactant mixture preferably lies in the range of 1 to 95% by weight of the total amount of starch and monomer in the reactant mixture.

The choice of the type and amount of the polymerizable cyclic ester monomer, as outlined in (II) above, is based on biodegradability, compatibility considerations, molecular weight, melt viscosity, mechanical properties, processability, hydrophobicity, and cost. The more important amongst these are believed to be biodegradability, hydrophobicity, melt viscosity, mechanical properties and compatibility considerations.

In accordance with the invention, the cyclic ester monomers of choice are those that polymerize to form aliphatic polyesters like non-substituted lactones like ε-caprolactone, δ-valerolactone, β-propiolactone, substituted lactones like β-butyrolactone, β-valerolactone, and the like, lactides, glycolide, cyclic anhydrides such as adipic anhydride, and cyclic carbonates. The preferred monomers within the scope of this invention that are to be polymerized in the presence of starch and in the absence of solvents (bulk polymerization) are ε-caprolactone and lactide isomers. It is further preferred that ε-caprolactone, in the range of 5–99% by weight of the total amount of starch and monomer in the reaction mixture, be the monomer that is to be polymerized.

Two classes of catalyst/initiator are preferred to carry out the aforementioned polymerization of the chosen monomer as outlined in (III) above; one being Lewis acid catalysts such as Ti, Zn, and Sn salts and more preferably stannous octoate (stannous 2-ethyl hexanoate) and the second being metal alkoxides like titanium tetrabutoxide, aluminum tri-sec butoxide, and aluminum isopropoxide. Metal alkoxides, as is, and metal alkoxides generated in situ by coupling of metal alkyls with starch hydroxyls or other functional groups discussed above are the preferred polymerization initiators. Metal alkoxides are represented as $M(OR)_x$ where M=Al, Ti, Zn, Zr, Sn and the like, and x is 1 to 3. Metal alkyls are represented as $M(Alk)_x$, where Alk=alkyl radical, linear or branched, substituted or not, with 1 to 18 carbon atoms and x is 1 to 3. Aluminum isopropoxide, aluminum tri-sec butoxide, alkoxide generated in situ by using tri ethyl aluminum or di-isobutyl aluminum hydride, and mixtures thereof are the most preferred initiators for the bulk polymerization of ε-caprolactone monomer, within the scope of the invention. It is preferred that the amount of such polymerization initiators/catalysts be at least 0.001% by weight of the reaction mixture.

Optional plasticizers or destructurizing agents for the composition that are in the scope of this invention, as outlined in (IV) are well known in the art. Typical plasticizers are water, dihydric, trihydric, polyhydric alcohols, and their derivatives. Some examples are ethylene glycol, propylene glycol, glycerol, glycerol esters, erythritol, pentaerythritol, sorbitol, and higher molecular weight plasticizers like poly glycerol and poly glycerol esters. Glycerol esters include glycerol monoacetate, diacetate, and triacetate.

For the purpose of this invention, it is preferred that the plasticizers chosen have a boiling point sufficiently higher than the processing temperature in the extruder and be thermally stable. The preferred plasticizers are glycerol, sorbitol, and mixtures thereof.

It is preferred that the amount of the plasticizer be in the range of 1 to 30% by weight of the total reactant mixture.

The reaction mixtures outlined in preceding paragraphs yield quantitative conversions of monomer to polymer, leading to aliphatic polyester-grafted starch substrates. These can be used as is in the final form or optionally, blended with other components to form the final biodegradable compositions within the scope of the invention. Such a blend composition using the aforementioned aliphatic polyester-grafted starch obtained by ring-opening polymerization, comprises the following:

(A) aliphatic polyester-grafted starch, synthesized as outlined above, wherein the starch phase may be in a form that is granular, plasticized, destructurized, solvated, physically or chemically modified in any other way, or as a mixture of these, wherein the aliphatic polyester includes polymers and copolymers of lactones, lactides, and glycolide, substituted or not, and mixtures of the above.

(B) optionally, other polymers, including those based on lactones, lactides, and glycolide, substituted or not, polyorthoesters, polymers and copolymers of hydroxybutyrate and hydroxyvalerate, poly(alkylene d-tartrate), vinyl polymers like poly(vinyl alcohol), poly(vinyl acetate), ethylene vinyl alcohol copolymer, ethylene-vinyl acetate copolymer, polyanhydrides like polyadipic anhydride, polycarbonates, polysaccharides like starches and cellulosics including cellulose, cellulose acetate, cellulose butyrate, and cellulose propionate, lignocellulose, starch, starch esters and amylose esters, each of these being in a form that is granular, plasticized, destructurized, solvated or physically or chemically modified in any other way, copolyesteramides, preferably based on caprolactone and caprolactam, polyolefins, polyurethanes, and mixtures thereof, each of these being hydrophobic or not, modified or not as in branched, cross-linked, copolymerized, functionalized, surface-modified, physically or chemically modified in other similar ways. Of these, the preferred polymers are those that are biodegradable based on polysaccharides as described above, lactones, lactides, and glycolide, substituted or not, and mixtures thereof, each of these being hydrophobic or not, modified or not as in branched, cross-linked, copolymerized, functionalized, surface-modified, physically or chemically modified in other similar ways. The branching or cross-linking is conducted separately or in-situ by a peroxide initiation; copolymers includes copolymers of lactones, lactides, and glycolide, substituted or not with each other and graft copolymers of lactones, lactides, and glycolide, substituted or not with various functional monomers like maleic anhydride, stearic anhydride, ethylene oxide, aliphatic and aromatic isocyanates, and acrylic acid, wherein the grafting of these functional monomers is conducted separately or in-situ, preferably by peroxide initiated grafting in an extruder, and wherein the amount of grafted monomer is at least 0.1% with respect to the main polymer; functionalization of lactones, lactides, and glycolide, substituted or not relates to end-capping these polymers with suitable functional groups like unsaturated groups, isocyanate groups and the like. The preferred amount of these polymers in the final composition is in the range of 10 to 90% by weight, and (C) optionally, additives in the range of 0.1 to 30% by weight based on the final composition like a monomeric or polymeric plasticizer other than water, to plasticize starch, composed of polar groups like OH, —NH, and —NH$_2$ that has a boiling point appreciably greater than the processing temperature, and optionally a polyhydric fatty acid ester in the amount of 1 to 10% by weight, to allow the composition to be stretched to high elongations before failure, referred to herein as a "stretching agent", and other additives like slip agents.

(D) optionally, peroxides to cross-link the polyester and improve melt strength, in the amount of 0.1 to 2 part of peroxide per hundred parts of the polyester, and (E) optionally, fillers and reinforcements employed in materials, specially plastics, in an amount up to 40% by weight of the composition, and Components C, D, and E may be incorporated in the original reaction mixture (comprising of I, II, III, and/or IV) and/or be admixed subsequent to the formation of polycaprolactone-grafted starch. Plasticizers for the non-starch-like polysaccharide components like poly (vinyl alcohol), polylactones, polylactides, and cellulosics described above are also included within the scope of the invention. Such plasticizers are those listed in the preceding paragraph and others including phthalic acid derivatives like diethyl phthalate, dimethyl phthalate, and dioctyl phthalate, phosphoric acid derivatives like triethyl phosphate, tributyl phosphate, and trioctyl phosphate.

Novel reaction formulations that enable polymerization of bulk monomer (in the absence of solvents), in the presence of starch or other substrates, allow the processing to be conducted in an extruder or other similar processing equipment employed in the plastics industry. Different catalyst and initiator systems lead to a diverse number of products with varied levels of grafting, with polymerization kinetics ranging from a few minutes to few hours, and with various molecular weights of the grafted polymer.

METHOD OF THE INVENTION

The following reactions represent some of the synthetic pathways that are used to formulate the aforementioned aliphatic polyester-grafted starch compositions, within the scope of the invention (I) Lewis acid catalyst Example with stannous octoate

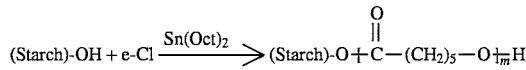

(II) Metal alkoxide

Example with aluminum isopropoxide a) Exchange reactions between starch hydroxyls and Al(OiPr)$_3$ catalytic amount

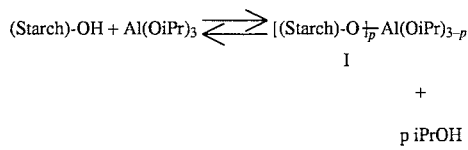

b) Ring-opening polymerization leading to polycaprolactone-grafted starch

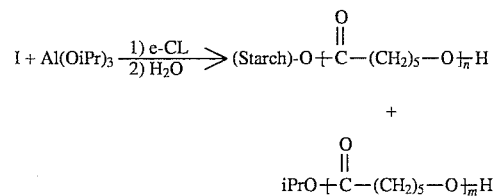

(III) "In-situ" generated metal alkoxide

Example with triethyl aluminum a) Initiator preparation

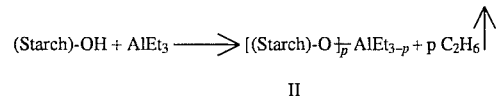

b) Ring-opening polymerization leading to polycaprolactone-grafted starch

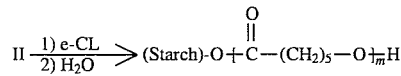

Polycaprolactone-grafted starch substrates were synthesized from bulk monomer, ε-caprolactone (in the absence of solvent) and in the presence of starch by an in-situ, ring opening polymerization, resulting in compositions with physical and/or chemical grafting, leading to good interfacial adhesion. Three different pathways were used, as represented by the reactions above. The reactions were conducted at various temperatures ranging from 60° to 150° C. In the first method, ring opening polymerization of ε-caprolactone was carried out using a Lewis acid catalyst such as stannous octoate, Sn(Oct)$_2$ in the presence of the starch. The initiation of ring opening proceeded from the hydroxyl groups from the starch phase (reaction I), leading to a grafting of the polycaprolactone chains onto starch. An improvement of adhesion was also expected by the fact that the polyester chains are growing in close contact to the starch phase.

In the second method, metal alkoxides such as aluminum isopropoxide, Al(OiPr)$_3$, and titanium tetrabutoxide, Ti(OnBu)$_4$, were used as initiators of the ε-caprolactone polymerization. It is expected that exchange reactions between the metal alkoxide groups and hydroxyls from starch or other added chemical species (reaction II a) generate additional active alkoxide functions that can promote polymerization of ε-caprolactone (reaction II b).

The third strategy is based on the fixation of aluminum alkoxide functions on to starch by an in-situ reaction between metal alkyls like triethyl aluminum and hydroxyl groups of starch. The reaction equilibrium is shifted towards the corresponding alkoxide, by evolution of ethane (reaction III a). According to the previously mentioned ring opening polymerization mechanism, grafting of polycaprolactone chains on to starch should be effectively achieved through the covalent ester bridge resulting from the initiation step (reaction III b).

The following non-limiting procedures and examples are used to further describe the invention and illustrate some of the highlights of the invention.

MATERIALS $\epsilon$-caprolactone monomer obtained from Aldrich was stored over molecular sieves 3 Å and purged with nitrogen. Catalysts and initiators used were also from Aldrich and are used as is or appropriately treated before use. Tin octoate and titanium tetrabutoxide were used as is, without further purification. Triethyl aluminum was obtained in a toluene solution (1.9 M). Aluminum isopropoxide was dissolved in dry toluene obtained by distillation after refluxing over calcium hydride. Aluminum tri-sec butoxide was dissolved in dry toluene to make a 1.0 M solution. Commercial industrial grade corn starch having a particle size of about 10 microns, plasticized or not, was used and was dried either in a forced convection oven at 90°–140° C. for no longer than 20 hours or in a vacuum oven (~0.1 mm Hg) at 90° C. for 20 hours. The extent of grafting was determined by selective extraction in toluene for 24 hours at room temperature.

EXAMPLE 1

15 g of $\epsilon$-caprolactone monomer was added to 15 g of dried, granular or plasticized starch in a 250 cc round bottom flask equipped with a stirrer and a rubber septum and previously purged with nitrogen. A determined amount of catalyst, stannous octoate was then introduced via a conditioned syringe at the desired temperature. Polymerization was stopped by fast cooling to room temperature and monomer conversion determined by selective precipitation of the polymeric fraction and starch in heptane, a procedure well known to those skilled in the art. The results are summarized in Table 1.

TABLE 1

Synthesis of starch-poly($\epsilon$-caprolactone) (50/50 monomer/starch wt %) compositions by "in-situ" polymerization of caprolactone promoted by Sn(Oct)$_2$

| Sample | "Sn" content (wt %) | Temp. (°C.) | Reaction time (h) | Monomer conversion[1] (%) | Extraction (wt %)[2] Insoluble | Extraction (wt %)[2] Soluble |
|---|---|---|---|---|---|---|
| 1 | 0.4 | 100 | 20 | 99.5 | 54 | 46 |
| 2 | 0.4[3] | 100 | 20 | 98 | 53 | 47 |
| 8 | 0.2 | 150 | 5 | 99 | 57 | 43 |
| 9 | 0.2[4] | 150 | 5 | 98 | 53 | 47 |
| 14 | 0.25[5] | 150 | 3 | >99.5 | 52 | 48 |

[1] as determined by selective precipitation of the polymeric fraction in heptane
[2] as achieved by solubilization in toluene (24 hours at room temperature), filtration and drying of each fraction (insoluble = starch-polycaprolactone graft; soluble = homopolymer poly($\epsilon$-caprolactone)
[3] in toluene (10 wt %)
[4] preliminary swelling of starch in $\epsilon$-caprolactone monomer by agitation at 90° C. for 16 hours
[5] starch plasticized with 25 wt % glycerol in extruder
[6] the starch was −10 micron particle size.

EXAMPLE 2

15 g of $\epsilon$-caprolactone monomer was added to 15 g of dried, granular or plasticized starch (50—50 monomer to starch wt %) in a 250 cc round bottom flask equipped with a stirrer and a rubber septum and previously purged with nitrogen. A determined amount of initiator, titanium tetrabutoxide, aluminum tri-sec butoxide, or aluminum isopropoxide solution in toluene was then introduced via a conditioned syringe at the desired temperature. Polymerization was stopped by fast cooling to room temperature and monomer conversion determined by selective precipitation of the polymeric fraction and starch in heptane. The results are summarized in Table 2.

TABLE 2

Synthesis of starch-polycaprolactone compositions by "in-situ" polymerization of $\epsilon$-caprolactone, at 100° C., promoted by metal alkoxides such as aluminum isopropoxide and titanium tetrabutoxide

| Sample | M(OR)$_x$ | "M" content (wt %) | Starch Content (wt %) | Starch Drying | Reaction time | Monomer conversion (%)[1] | Extraction (wt %)[2] Insoluble | Extraction (wt %)[2] Soluble |
|---|---|---|---|---|---|---|---|---|
| 7 | Al(OiPr)$_3$ | 0.05 | — | — | 5 min | >99.9 | — | — |
| 29 | | 0.15 | — | — | 3 min | >99.9 | — | — |
| 5 | | 0.025 | 50 | 20 h/100° C. | 18 h | 0 | 50 | 0 |
| 10 | | 0.025 | 50[3] | 6 h/90° C./vacuum | 24 h | 0 | 50 | 0 |
| 12 | | 0.15 | 50 | 20 h/100° C./ | 20 min | 30 | 52 | 13 |
| 30 | | 0.15 | 50 | 20 h/90° C./vacuum | 40 min | 18 | — | — |
| 31 | | 1.0 | 50 | 20 h/90° C./vacuum | 3 h | 70 | — | — |
| 11 | Ti(OnBu)$_4$ | 1.4 | 50 | 20 h/100° C./ | 24 h | 98.5 | 60 | 40 |

[1] as determined by selective precipitation of the polymeric fraction in heptane
[2] as achieved by solubilization in toluene (24 hours at room temperature), filtration and drying of each fraction (insoluble = starch-polycaprolactone graft copolymer; soluble = homopolymer poly($\epsilon$-caprolactone)
[3] starch plasticized with 25 wt % glycerol in extruder

EXAMPLE 3

15 g of ε-caprolactone monomer was added to 15 g of dried, granular or plasticized starch (50—50 wt %) in a 250 cc round bottom flask equipped with a stirrer, an oil valve for removal of volatiles, and a rubber septum and previously purged with nitrogen. A determined amount of triethyl aluminum solution in toluene was then introduced via a conditioned syringe at room temperature. the reaction medium was then heated to the desired temperature. Polymerization was stopped by fast cooling to room temperature and monomer conversion was determined as before. The results are summarized in Table 3.

together) in compositions of Example 1 and 3 is shown in the scanning electron microscope (SEM) images. SEM image of a typical composition synthesized using aluminum alkoxide (Example 2) is similar to that obtained with stannous octoate in Example 1 exhibiting good interfacial adhesion. A SEM image of the insoluble fraction in toluene (polycaprolactone-grafted starch), of the material in Example 3 shows good interfacial adhesion. A lack of interfacial adhesion appears in simple blends of polycaprolactone and starch (50/50 wt %).

Blend compositions for bags can be readily processed in to films by either of the two common methods employed in the plastics industry, namely flat-die extrusion and blown

TABLE 3

Synthesis of starch-polycaprolactone (50/50 wt %) compositions by bulk polymerization of ε-caprolactone initiated by aluminum alkoxides generated "in situ" by reaction between AlEt$_3$ and hydroxyl functions of granular or plasticized starch

| Sample | Al content (wt %) | Starch Type | Drying | Temp. (°C.) | Reaction time | Monomer conversion (%)[1] | Extraction (wt %)[2] Insoluble | Soluble |
|---|---|---|---|---|---|---|---|---|
| 26 | 0.09 | Plasticized[3] | 6 h/90° C./vacuum | 70 | 5 min | 97 | 82 | 18 |
| 25 | 0.15 | | 6 h/90° C./vacuum | 80 | 8 min | >99.9[5] | 85 | 15 |
| 22 | 0.3 | | 6 h/90° C./vacuum | 80 | 6 min | >99.9[5] | 81 | 19 |
| 20 | 0.3 | | 6 h/90° C./vacuum | 110 | 13 min | >99.9[5] | 81 | 19 |
| 15 | 0.5 | | 6 h/90° C./vacuum | 150 | 4 min | >99.9[5] | 80 | 20 |
| 24 | 0.1 | Granular | 20 h/100° C. | 80 | 23 h | 0 | 50 | 0 |
| 21 | 0.2 | | 20 h/100° C. | 150 | 36 min | 0 | 50 | 0 |
| 16 | 0.3 | | 20 h/100° C. | 110 | 7 min | 35 | — | — |
| 27 | 0.1 | | 20 h/90° C./vacuum | 90 | 3 min | >99.9 | 95 | 5 |
| 18 | 0.3 | Blend[4] (10% G) | 20 h/100° C. | 100 | 15 min | >99.9 | 68 | 32 |
| 19 | 0.3 | Blend[4] (25% G) | 20 h/100° C. | 110 | 24 min | 75 | — | — |

[1] as determined by selective precipitation of the polymeric fraction in heptane;
[2] as achieved by solubilization in toluene (24 hours at room temperature), filtration and drying of each fraction (insoluble = starch-polycaprolactone graft copolymer; soluble = homopolymer poly(ε-caprolactone);
[3] starch plasticized with 25 wt % glycerol in extruder;
[4] (100-X) wt % starch and X wt % glycerol (G), with X = 10 or 25, blending before ε-caprolactone addition;
[5] foam structure due to evolution of ethane during polymerization process

EXAMPLE 4

400 g of ε-caprolactone monomer, previously dried over molecular sieves was mixed with 4 g of dry granular starch in a reaction kettle under nitrogen flow. The mixture was fed to a Werner Pfleiderer twin screw extruder ZSK-30 (New Jersey), heated to 100° C. A separate stream of a 1.0 M solution of aluminum tri-sec butoxide in toluene was also fed to the extruder. Complete polymerization was achieved leading to a high molecular weight polymer.

EXAMPLE 5

A 1.0 molar solution in toluene 10 weight percent starch suspension in toluene is mixed with triethyl aluminum (1.0 M solution toluene). The mixture is heated to 85° C. under a nitrogen flow. After complete ethane evolution, the reaction is returned to room temperature and the starch granules are washed and dried to yield a modified starch with anchored initiating species. This can be blended with other polymers.

The evidence for the coupling of active initiator species such as in Example 5 onto the starch hydroxyls as proposed in the above reactions is shown by an Al peak in the X-ray photoelectron spectroscopy (XPS) scan of the a starch surface reacted with TEA. Good interfacial adhesion (because the interface of the different polymers is blended film extrusion. For use as a material for film applications it is essential that the melt be highly extensible with a high melt strength, not only for ease of processing but also for control of the mechanical properties of the final product. In the blown film process, the melt exits via a tubular die of a certain wall thickness (D) and is blown to form a bubble with a reduced wall thickness (d). This ratio D/d is called the draw-down ratio and for film-forming operations typically ranges from about 10 to 30, depending on the material and the ultimate film thickness required. In the flat-die extrusion process, the melt exits from a slit of rectangular cross-section and is drawn down to a reduced thickness on to a chill roll which rotates at a certain speed to control ultimate film thickness. In both these processes, it is essential to have high draw-down ratios at high speeds, for ease of processing. The draw-down ratio is directly dependent on the melt strength and melt elasticity, with a higher draw-down ratio resulting from a material with a higher melt strength and elasticity. The draw-down ratio of the blend is considerably improved when the poly(ε-caprolactone) forms the continuous phase. It is further required that the least amount of water be present in the system, if any, since the presence of water is expected to be detrimental to the molecular weight and melt extensibility of the formulations. This is due to interchange reactions that could take place between the hydroxyls and the carbonyl group of the poly(ε-caprolactone). Such interchange reactions cleave the polymer chains resulting in lower molecular weights and a concomitant reduction in melt elongation and strength. By the same token, these interchange reactions between the carbonyl of poly(ε-caprolactone) and the hydroxyls from both the added glycerol and starch molecules serve to influence the compatibility of the blend components, promoting greater interfacial adhesion. However, the effect of glycerol on the melt extensibility is minimal, if any. The presence of water in amounts greater than 2 weight percent is detrimental since the effect of reduced melt elongations is greater than the enhancement of interfacial adhesion.

Further, poly(ε-caprolactone) can be melt-crosslinked by the use of peroxides to improve the melt strength of the blend, thereby improving the bubble stability in blown-film operations. Peroxides such as 2,5-dimethyl-2,5-di(t-butyl peroxy) hexane, benzoyl peroxide, dicumyl peroxide, and t-butyl peroxide are typically used for grafting reactions and cross-linking reactions.

It is preferred that the peroxide of choice for the purposes of this invention be 2,5-dimethyl-2,5-di(t-butyl peroxy) hexane. The optional amount of peroxide needed for crosslinking poly(ε-caprolactone) ranges from 0.1 to 2 part of peroxide solution per hundred parts of the polyester. It is further preferred that the amount of peroxide used be in the range of 0.1 to 1 part of peroxide per hundred parts of the polyester.

The final compositions may contain one or more of the following optional additives that are well known in the plastics industry. These include anti-block and slip additives that prevent tackiness in the formed product like fatty acids, fatty acid amides, and esters, waxes, fluorinated polymers, and metal oxides, lubricants, flame retardants, viscosity modifiers, processing aids and colorants.

The preferred amounts of each of the above optional additives is in the range of 0.1 to 30 parts by weight based on 100 parts of final composition.

A number of applications other than films for bags are envisaged for the aliphatic polyester-grafted polysaccharides and the blends and composites with other polymers that are within the scope of this invention. They can be used to formulate various structures including moldings, films, and foams.

Another application for which such aliphatic polyester-grafted polysaccharides can be employed is in the area of hydrophobic, biodegradable coatings on suitable substrates, such substrates being paper, biodegradable films based on starches and cellulosics, other films, fiber mats and other materials. Current processing methods for such materials is by calendering and co-extrusion. In such processes, a suitable tie-layer is needed to maintain adhesion between the various layers of the laminate and the material is subject to delamination. The alternative method using such grafted substrates is one in which an aliphatic polyester polysaccharide coating is directly grafted to the substrate with inherently good adhesion. In a typical process, the substrate (paper, film etc.) is passed through a drier to remove surface moisture followed by a bath containing the catalyst initiator at the appropriate temperature. Then the substrate is passed through a second bath containing the monomer, say, ε-caprolactone, and the residence time is adjusted to complete polymerization and yield the grafted polymer coating.

Another viable application of these aliphatic polyester-grafted polysaccharides is in the synthesis of biodegradable foam structures for various applications. It involves use of the foam structure for selective absorption of certain organic solvents viz., in waste treatment. The organic solvents that can be selectively absorbed are those that swell the specific surface-grafted polyester in question. The synthesis using triethyl aluminum as described above is controlled to yield a variety of morphologies ranging from a fully dense to a foam structure. The foam structures are generated by the evolution of ethane as a volatile by-product during the in-situ, ring-opening polymerization and grafting. The dense structures are obtained by controlling the experimental condition such that ethane evolution precedes polymerization.

The foregoing description is only illustrative of the present invention and the present invention is limited only by the hereinafter appended claims.

We claim:

1. A process for forming a polymer which is a starch grafted with an aliphatic polyester which comprises:
    (a) drying the starch in an oven for up to 20 hours at 90° to 140° C. until there is less than 2% by weight moisture to produce a dried starch; and
    (b) reacting the dried starch with a cyclic aliphatic ester monomer containing 4 to 24 carbon atoms in the presence of an organometallic polymerizing agent at a temperature between about 60° and 150° C. in absence of a solvent for the starch or the monomer.

2. The process of claim 1 wherein the monomer is ε-caprolactone and the starch is selected from the group consisting of a granular starch, a destructurized starch, a plasticized starch, and mixtures thereof and the organometallic polymerizing agent is an aluminum alkyl.

3. The process of any one of claims 1 or 2 wherein the agent is a metal alkyl.

4. The process of claims 1 or 2 wherein the agent is a Lewis acid.

5. The process of any one of claims 1 or 2 wherein the agent is a metal alkoxide.

6. The process of any one of claims 1 or 2 wherein the agent is selected from the group consisting of stannous octoate, titanium tetrabutoxide, aluminum isopropoxide, aluminum-tri-secbutoxide, tri ethyl aluminum, di-isobutyl aluminum hydroxide and mixtures thereof.

7. The process of claim 1 wherein the agent is tri ethyl aluminum reacted with the polysaccharide at a temperature greater than 50° C. and wherein the monomer is ε-caprolactone.

8. The process of claim 2 wherein the aluminum alkyl is selected from the group consisting of methyl aluminum and diisobutyl aluminum hydride.

* * * * *